Patented Aug. 30, 1949

2,480,814

UNITED STATES PATENT OFFICE 2,480,814

VULCANIZATION OF RUBBER WITH UREA-METAL SALT COMPLEX ACCELERATORS

Thomas Punshon, Jr., and Ira Williams, Borger, Tex., assignors to J. M. Huber Corporation, Borger, Tex., a corporation of Delaware No Drawing. Application August 24, 1946, Serial No. 692,920

18 Claims. (Cl. 260—794)

This invention relates to processes for the vulcanization of rubber and to the products of such processes as articles of manufacture. More particularly, it relates to the acceleration of the vulcanization of rubber by means of novel agents which may serve either as accelerators or as activating-accelerators in conjunction with conventional or other accelerators.

An object of the present invention is to provide processes of vulcanization employing a new class of accelerators which are effective in producing superior vulcanized products and which at the same time are inexpensive to produce.

It has heretofore been suggested that various substances including amines and guanidines be employed with acidic type accelerators for accomplishing activation, but this type of activator usually produces increased action not only at vulcanizing temperatures but also at lower temperatures with the result that premature vulcanization is encountered. An additional object of the present invention is to provide vulcanization processes employing a novel class of activators which, though quite active at vulcanizing temperatures, do not induce premature vulcanization.

A further object of the invention is to provide new compositions of matter which are valuable in the compounding of rubber and capable of producing vulcanized products of superior quality.

According to the present invention the vulcanization of rubber is carried out in the presence of a urea-metal salt complex composed of a urea combined with a hydratable salt. In this way the vulcanization may be accelerated without experiencing difficulty from premature activity in the rubber mass, and vulcanized products may be obtained which have physical properties distinctly superior to those of analogous products produced in other ways.

The complexes employed pursuant hereto are compounds producable or produced by the reaction or combination of a urea with a hydratable metal salt. A "hydratable" salt, as referred to herein, is a salt that either is hydrated with water of crystallization or is capable of being so hydrated, as distinguished from non-hydrated, non-hydratable salts. The salts particularly adapted to the present purpose are those which contain elements having a high, effective nuclear charge, such as oxygen, and which are capable of holding from one to a great many molecules of water in their crystal structure, the water probably being held by means of a 2-covalent hydrogen atom and usually being releasable simply by heating the hydrated salt.

When the complex is produced by combining a hydrated salt with a urea compound, the urea molecule or molecules may become added without replacing water of crystallization, or they may replace one or more of the water molecules of the hydrated salts. In the latter event they apparently become bonded with the salt molecule at the points of displacement of molecules of water of hydration. When an anhydrous salt capable of being hydrated is employed in making the complex, the urea molecule or molecules apparently attach to the salt molecule in a manner analogous to that in which water of hydration combines in the formation of crystals.

Although urea compounds as a class appear to be suitable for producing the required urea-salt complexes, the ureas found to be the most satisfactory comprise urea itself and hydrocarbon substituted ureas of the general formula:

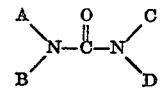

in which A, B, C and D are either hydrogen or aliphatic, cycloaliphatic or aromatic radicals, with the limitation that not more than two of the substituents are such radicals at the same time and the remaining substitutents are hydrogen atoms. Either or both of the substitutents A and B together and C and D together may be single alkyl radicals twice joined to the nitrogen atoms thereby forming a ring or rings with the nitrogen atoms, such as contained in piperidyl urea, for example.

In the urea-salt complex compounds, the number of urea molecules may vary in much the same manner as the number of molecules of water in hydrated salts. Since the hydratable salts themselves vary considerably in the number of molecules of water combined or combinable therewith, considerable differences in the number of combined urea molecules exist in the respective hydratable salts contemplated for the production of the urea-salt complexes. The number of urea molecules associated with the hydratable salt may vary from one to about eighteen. When, in producing the complex salts, there is employed an insufficient amount of the urea compound to displace all of the water molecules in a hydrated salt, the complex obtained may contain therein from one to about twelve molecules of water depending upon the specific salt employed and the proportions of the reactants used. The above described compounds may be represented by the following structure from which it will be observed that the urea-salt complexes are addition products:

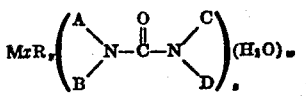

in which M is a metal and $x$ is the number of atoms thereof, R is the anion of the salt and $y$ the number thereof, $z$ is from 1 to about 18 and $w$ is from 0 to about 12.

In a specific embodiment, the present invention contemplates a vulcanization process in which the acceleration is accomplished through vulcanization in the presence of a urea-salt complex in admixture with a quantity of a urea compound in uncombined state. This mixture may be produced merely by adding an amount of the urea compound in excess of that which will combine with the hydratable salt, either already hydrated or capable of being hydrated. The ratio of the amount of the urea compound to that of the urea-salt complex in the mixture is not critical.

The urea-salt complexes of the present invention may be prepared in a number of ways. In some instances they may be produced merely by forming water solutions of the two ingredients and then evaporating the water thereby depositing the urea-salt complex. Alternatively, the complexes may ordinarily be easily formed by fusion of a mixture of the ingredients. In an article in the J. Soc. Chem. Ind., Japan 42 Suppl. binding 210 (1939) processes are described for the production of a urea-salt complex composed of one molecule of calcium sulphate combined with four molecules of urea, the production being accomplished either by fusing the components together or by crystallizing the complexes from aqueous solutions of the components.

The nature and advantages of the present invention and of the compounds employed appear further from the following illustrative examples, wherein physical properties are given in pounds per square inch.

*Example 1*

One mol (219 grams) of zinc acetate dihydrate crystals was mixed with 1 mol (60 grams) of urea. The resulting mixture was then heated slowly. At about 85° C. it became a pasty mass, and at 100° C. it changed to a clear liquid. The fused mass was next poured on a porcelain slab and permitted to cool. It was then removed and ground. A rubber composition was produced containing the complex and other ingredients in the following amounts:

| | Grams |
|---|---|
| Smoked sheet rubber | 100 |
| Zinc oxide | 5 |
| Sulfur | 3 |
| Stearic acid | 3 |
| The urea-salt complex | 2 |

After being vulcanized for 75 minutes at 284° F., this rubber compound was tested and found to have a tensile strength of 2320. A sample of a rubber compound omitting the urea-salt complex, after vulcanization for the same period, showed on test a tensile strength of only 600 pounds.

*Example 2*

A mixture of 1 mol (138 grams) of zinc propionate with 1 mol (60 grams) of urea was heated to 105° C. when a clear liquid was formed. After being cooled and ground, the resulting complex was compounded in the formula given in Example 1 and vulcanized under the same conditions. A rubber compound was produced having a tensile strength of 2260.

*Example 3*

A mixture of 1 mol of n-butyl urea with 1 mol of zinc acetate dihydrate was heated to 100° C. until a clear liquid was formed. This complex, after being cooled and ground, was compounded in the formula of Example 1 and vulcanized at the same temperature. The rubber compound obtained was cured only 45 minutes and it showed on test a tensile strength of 2250.

*Example 4*

A mixture of 1 mol of phenylurea and 1 mol of zinc acetate diyhdrate was heated to form a clear liquid at 105° C. and after being cooled and ground the salt-complex obtained was compounded in the formula of Example 1 and cured at the same temperature for a period of 90 minutes. A rubber compound was obtained having a tensile strength of 2190.

*Example 5*

A mixture of 4 mols of urea (240 grams) with 1 mol of zinc acetate dihydrate (219 grams) was heated to form a clear liquid at about 70° C. In a similar manner, a mixture of 10 mols (600 grams) of urea with 1 mole of zinc acetate dihydrate was heated to form a clear liquid at 105° C. Each of the reaction products, after being solidified by cooling, was ground to a powder. These urea-salt complexes were then tested to ascertain and demonstrate their activating capacities when employed in conjunction with an acidic accelerator, specifically with mercaptobenzothiazole. Three rubber mixes were made up as indicated in the following table:

| | A | B | C |
|---|---|---|---|
| Smoked Sheets | 100 | 100 | 100 |
| Zinc Oxide | 5 | 5 | 5 |
| Sulfur | 3 | 3 | 3 |
| 4–1 urea-salt complex | | .5 | |
| 10 to 1 urea-salt complex | | | .5 |
| Mercaptobenzothiazole | 1 | .5 | .5 |

These products were vulcanized at 284° C. for various periods with the results set forth in the following table:

| Cure Min. | Compound A | | Compound B | | Compound C | |
|---|---|---|---|---|---|---|
| | Load 500% Elong. | Tensile at Break | Load 500% Elong. | Tensile at Break | Load 500% Elong. | Tensile at Break |
| 15 | 520 | 2,940 | 540 | 3,540 | 460 | 3,360 |
| 30 | 660 | 3,320 | 860 | 3,600 | 700 | 3,580 |
| 60 | 720 | 3,000 | 900 | 3,140 | 790 | 3,320 |
| 90 | 700 | 2,700 | 860 | 3,340 | 820 | 3,250 |

*Example 6*

A mixture of 1 mol of zinc acetate dihydrate, 1 mol of zinc propionate and 8 mols of urea was heated to 100° C. to form a clear liquid. Upon being permitted to cool, the urea-salt complex solidified at 60° C. After being powdered, this complex was mixed with mercaptozenzothiazole and was compared in accelerating activity with a product sold under the trade-name "Santocure" which is derived from or contains mercaptobenzothiazole. The following rubber mixes were produced:

|  | A | B |
|---|---|---|
| GR-S Synthetic Rubber [1] | 100 | 100 |
| High Modulus Furnace carbon | 50 | 50 |
| Zinc Oxide | 5 | 5 |
| Sulfur | 2 | 2 |
| Rosin | 8.5 | 8.5 |
| Urea Complex | .625 |  |
| Mercaptobenzothiazole | .625 |  |
| Santocure |  | 1.25 |

[1] A butadiene-styrene interpolymer.

These compositions were vulcanized at 280° F. and samples were cured for various periods of time. Upon testing, the samples were found to possess the physical properties set forth in the following table:

| Cure Min. | A | | B | |
|---|---|---|---|---|
|  | Load at 400% Elong. | Tensile at Break | Load at 400% Elong. | Tensile at Break |
| 45 | 1,180 | 2,310 | 720 | 1,770 |
| 60 | 1,360 | 2,360 | 980 | 2,170 |
| 75 | 1,460 | 2,330 | 1,040 | 2,260 |
| 90 | 1,560 | 2,420 | 1,180 | 2,340 |

*Example 7*

The metal salts and the urea compounds set forth in the following table were mixed in the molar proportions indicated and fused by heating to the temperatures indicated in the table:

| Metal Salt | Molar Proportion | Urea Compound | Molar Proportion | Temperature To Liquify, °C. |
|---|---|---|---|---|
| Cadmium Acetate $2H_2O$ | 1 | Urea | 1 | 90 |
| Cobalt Acetate $4H_2O$ | 1 | do | 1 | 100 |
| Basic aluminum Acetate | 1 | do | 1 | 120 |
| Nickelous acetate $4H_2O$ | 1 | do | 1 | 90 |
| Mercuric acetate | 1 | do | 1 | 100 |
| Magnesium acetate $4H_2O$ | 1 | do | 1 | 80 |
| Sodium dichromate $2H_2O$ | 1 | do | 4 | 105 |
| Sodium acetate $3H_2O$ | 1 | do | 4 | 90 |
| Ferric chloride $7H_2O$ | 1 | do | 4 | 70 |
| Lead acetate $3H_2O$ | 1 | do | 4 | 80 |
| Copper sulfate $5H_2O$ | 1 | do | 4 | 90 |
| Potassium Ferrocyanide $3H_2O$ | 1 | do | 4 | 110 |
| Potassium Oxalate $1H_2O$ | 1 | do | 4 | 115 |
| Calcium Sulfate $2H_2O$ | 1 | do | 4 | 95 |
| Sodium Carbonate $1H_2O$ | 1 | do | 4 | 100 |
| Sodium Carbonate | 1 | do | 4 | 115 |
| Sodium Tungstate $2H_2O$ | 1 | do | 4 | 80 |
| Cadmium Sulfate $8H_2O$ | 1 | do | 4 | 70 |
| Sodium Pyrophosphate $10H_2O$ | 1 | do | 4 | 60 |
| Sodium Thiosulfate $5H_2O$ | 1 | do | 4 | 50 |
| Zinc Sulfate $1H_2O$ | 1 | do | 5 | 100 |
| Zinc Sulfate $7H_2O$ | 1 | do | 10 | 90 |
| Aluminum Sulfate $18H_2O$ | 1 | do | 18 | 90 |
| Calcium Chloride | 1 | do | 6 | 100 |
| Zinc Acetate $2H_2O$ | 1 | s-dibutyl | 1 | 100 |
| Do | 1 | as-dibutyl | 1 | 100 |
| Do | 1 | s-diphenyl | 1 | 170 |
| Do | 1 | as-diphenyl | 1 | 150 |
| Do | 1 | Piperidyl | 1 | 95 |

When the metal salt employed contains some water of crystallization, the preparation of the complexes is most easily accomplished by fusion. However, many salts, even in the anhydrous condition, will readily fuse with the urea. When salts containing a large number of molecules of water of crystallization are heated and reacted with the urea compound, some or all of the water molecules may be expelled as hereinbefore indicated.

The urea-salt derivatives herein described may be employed alone as accelerators of vulcanization or they may be used as secondary accelerators or activators along with the following acidic type accelerators. Among the acid accelerators there may be mentioned various sulfur containing compounds such as aryl mercaptothiazoles and their disulfides, mercaptothiazolines, various dithio acids and dithio carbamic acids and their sulfides. There also may be mentioned various metal and ammonium salts and various esters of the acid or mercaptan corresponding to the above types. All of these compounds are generally referred to in the trade as acidic type accelerators because they either are already acidic in nature or hydrolize to produce acidic substances.

*Example 8*

The effect of the use of the urea-salt complexes of the present invention in combination with acidic accelerators in avoiding premature vulcanization is illustrated by the following test:

Three rubber masses were compounded as follows:

|  | A | B | C |
|---|---|---|---|
| Smoked Sheet | 100 | 100 | 100 |
| Zinc Oxide | 5 | 5 | 5 |
| Sulfur | 3 | 3 | 3 |
| Mercaptobenzothiazole | 1.0 | 1.0 | 1.0 |
| Diphenylguanidine | .5 |  |  |
| Allyl thiourea |  | .5 |  |
| Urea-sodium acetate, 6 to 1 |  |  | .5 |

Samples of each compound were placed in an oven at 85° C., and their plasticity was determined at various intervals.

After 2 hours stocks A and B were no longer plastic while the stock containing the urea-sodium acetate complex was still plastic after four hours.

The vulcanization processes of the present invention are not limited to any particular rubber compounding ingredients nor to any specific procedure for mixing the ingredients. For instance, mixtures of urea-metal salt complex and mercaptobenzothiazole may be prepared during the process of making the complex, or later by mixing the respective solid materials. If desired, other substances, such as stearic acid, ordinarily may be incorporated in the complex. The vulcanization processes are applicable not only to natural rubber but also to various types of synthetic rubbers as prepared by polymerization of conjugated dienes either alone or with other polymerizable substances. Zinc oxide is usually employed in the vulcanization to secure maximum accelerator activity and results, but its presence is not essential.

The present invention extends to all equivalents of the compounds and procedures above described within the scope of the appended claims, which should not be restricted except as the prior art may require.

We claim:

1. In the vulcanization of rubber, the improved method of acceleration which comprises adding to a vulcanizable rubber compound and effecting the vulcanization of such compound with sulfur in the presence of a small amount of an addition product of a hydratable metal salt and a urea of the formula

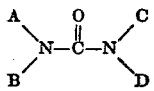

in which the substituents A, B, C and D are selected from the group consisting of hydrogen and the following hydrocarbon radicals: (1) aliphatic radicals each joined once to a nitrogen atom, (2) alkylene radicals each joined twice to a nitrogen atom as two of said substituents to form a ring including the nitrogen atom, (3) cyclo-aliphatic radicals and (4) aromatic radicals, and in which not more than two such radicals are present at the same time.

2. In the vulcanization of rubber, the improved method of acceleration which comprises adding to a vulcanizable rubber compound and effecting the vulcanization of such compound with sulfur in the presence of a small amount of an addition product of urea and a hydratable metal salt.

3. In the vulcanization of rubber, the improved method of acceleration which comprises adding to a vulcanizable rubber compound and effecting the vulcanization of such compound with sulfur in the presence of a small amount of an addition product of urea and a hydratable metal salt that is a product of fusion of said salt with urea.

4. A method as described in claim 3, said salt being a hydrated metal salt.

5. A method as described in claim 3, said salt being free of water of hydration.

6. In the vulcanization of rubber, the improved method of acceleration which comprises adding to a vulcanizable rubber compound and effecting the vulcanization of such compound with sulfur in the presence of a small amount of an addition product of urea and a hydratable metal sulfate that is a product of fusion of said sulfate with urea.

7. In the vulcanization of rubber, the improved method of acceleration which comprises adding to a vulcanizable rubber compound and effecting the vulcanization of such compound with sulfur in the presence of a small amount of an addition product of urea and a hydratable metal acetate that is a product of fusion of said acetate with urea.

8. In the vulcanization of rubber, the improved method of acceleration which comprises adding to a vulcanizable rubber compound and effecting the vulcanization of such compound with sulfur in the presence of a small amount of an addition product of urea and sodium thiosulfate that is a product of fusion of sodium thiosulfate with urea.

9. In the vulcanization of rubber, the improved method of acceleration which comprises adding to a vulcanizable rubber compound and effecting the vulcanization of such compound with sulfur in the presence of an organic sulfur-containing acidic type accelerator and a small amount of an addition product of urea and a hydratable metal salt.

10. In the vulcanization of rubber, the improved method of acceleration which comprises adding to a vulcanizable rubber compound and effecting the vulcanization of such compound with sulfur in the presence of an organic sulfur-containing acidic type accelerator and a small amount of an addition product of a hydratable metal salt and a urea of the formula

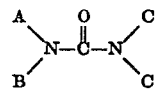

in which the substituents A, B, C, and D are selected from the group consisting of hydrogen and the following hydrocarbon radicals: (1) aliphatic radicals each joined once to a nitrogen atom, (2) alkylene radicals each joined twice to a nitrogen atom as two of said substituents to form a ring including the nitrogen atom, (3) cyclo-aliphatic radicals and (4) aromatic radicals, and in which not more than two such radicals are present at the same time.

11. A rubber vulcanization accelerator composition comprising an organic sulfur-containing acidic type accelerator and an addition product of a hydratable metal salt and a urea of the formula

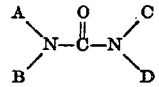

in which the substituents A, B, C and D are selected from the group consisting of hydrogen and the following hydrocarbon radicals: (1) aliphatic radicals each joined once to a nitrogen atom, (2) alkylene radicals each joined twice to a nitrogen atom as two of said substituents to form a ring including the nitrogen atom, (3) cyclo-aliphatic radicals and (4) aromatic radicals, and in which not more than two such radicals are present at the same time, the content of said acidic type accelerator being at least about as large as the content of said addition product.

12. A rubber vulcanization accelerator composition comprising an organic sulfur-containing acidic type accelerator and an addition product of urea and a hydratable metal salt, the content of said acidic type accelerator being at least about as large as the content of said addition product.

13. A composition as described in claim 12, said acidic type accelerator being mercaptobenzothiazole.

14. A rubber vulcanization accelerator composition comprising an organic sulfur-containing acidic type accelerator and an addition product of urea and a hydratable metal sulfate, the content of said acidic type accelerator being at least about as large as the content of said addition product.

15. A rubber vulcanization accelerator composition comprising an organic sulfur-containing acidic type accelerator and an addition product of urea and a hydratable metal acetate, the content of said acidic type accelerator being at least about as large as the content of said addition product.

16. A rubber vulcanization accelerator composition comprising an organic sulfur-containing acidic type accelerator and an addition product of urea and sodium thiosulfate that is a product of fusion of urea with sodium thiosulfate, the content of said acidic type accelerator being at least above as large as the content of said addition product.

17. An unvulcanized rubber composition comprising vulcanizable rubber, sulfur and a small amount of an addition product of a hydratable metal salt and a urea of the formula

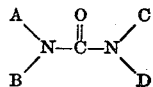

in which the substituents A, B, C and D are selected from the group consisting of hydrogen and the following hydrocarbon radicals: (1) aliphatic radicals each joined once to a nitrogen atom, (2) alkylene radicals each joined twice to a nitrogen atom as two of said substituents to form a ring including the nitrogen atom, (3) cycle-aliphatic radicals and (4) aromatic radicals, and in which not more than two such radicals are present at the same time.

18. An unvulcanized rubber composition comprising vulcanizable rubber, sulfur, a small amount of an organic sulfur-containing acidic type vulcanization accelerator and a small amount of an addition product of a hydratable metal salt and a urea of the formula

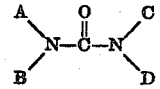

in which the substituents A, B, C and D are selected from the group consisting of hydrogen and the following hydrocarbon radicals: (1) aliphatic radicals each joined once to a nitrogen atom, (2) alkylene radicals each joined twice to a nitrogen atom as two of said substituents to form a ring including the nitrogen atom, (3) cyclo-aliphatic radicals and (4) aromatic radicals, and in which not more than two such radicals are present at the same time.

THOMAS PUNSHON, Jr.
IRA WILLIAMS.

REFERENCES CITED

The following references are of record in the file of this patent:

UNITED STATES PATENTS

| Number | Name | Date |
| --- | --- | --- |
| 1,440,963 | Cadwell | Jan. 2, 1923 |
| 1,503,430 | Russell | July 29, 1924 |
| 1,904,573 | Tuley | Apr. 18, 1933 |